United States Patent
Bai et al.

(10) Patent No.: US 11,405,975 B2
(45) Date of Patent: Aug. 2, 2022

(54) LINK FAILURE RECOVERY PROCEDURE FOR A PRIMARY CELL (PCELL) AND A SECONDARY CELL (SCELL)

(71) Applicant: QUALCOMM Incorporated, San Diego, CA (US)

(72) Inventors: Tianyang Bai, Bridgewater, NJ (US); Tao Luo, San Diego, CA (US); Kiran Venugopal, Raritan, NJ (US); Jung Ho Ryu, Fort Lee, NJ (US); Yan Zhou, San Diego, CA (US); Xiao Feng Wang, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/805,502

(22) Filed: Feb. 28, 2020

(65) Prior Publication Data

US 2020/0314942 A1    Oct. 1, 2020

Related U.S. Application Data

(60) Provisional application No. 62/826,921, filed on Mar. 29, 2019.

(51) Int. Cl.
*H04W 76/19*       (2018.01)
*H04W 74/08*       (2009.01)
(Continued)

(52) U.S. Cl.
CPC .......... *H04W 76/19* (2018.02); *H04W 24/10* (2013.01); *H04W 72/0413* (2013.01); *H04W 74/0833* (2013.01); *H04W 80/02* (2013.01)

(58) Field of Classification Search
CPC ............. H04W 76/19; H04W 74/0833; H04W 72/0413; H04W 80/02; H04W 24/10;
(Continued)

(56) References Cited

U.S. PATENT DOCUMENTS 10,855,359 B2 * 12/2020 Zhou .................... H04B 7/0695
10,887,939 B2 *  1/2021 Zhou .................... H04B 17/103
(Continued)

FOREIGN PATENT DOCUMENTS

WO        2019033072 A1     2/2019

OTHER PUBLICATIONS

International Search Report and Written Opinion—PCT/US2020/020630—ISAEPO—dated Jun. 15, 2020.
OPPO: "Discussion on Multi-Beam Operation Enhancements", 3GPP Draft, 3GPP TSG RAN WG1 #96, R1-1902704, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019) XP051600399, 9 Pages, Retrieved from the Internet: URL: http://www.3gpp.org/ftp/tsg%5Fran/WG1%5FRL1/TSGR1%5F96/Docs/R1%2D1902704%2Ezip, [retrieved on Feb. 15, 2019] Sections 1.-3.
(Continued)

*Primary Examiner* — Brian T O Connor
(74) *Attorney, Agent, or Firm* — Haynes and Boone, LLP

(57) ABSTRACT

Wireless communications systems and methods related to handling link failures in a first cell and a second cell are provided. A wireless communication device can detect a first link failure associated with a first cell and can detect a second link failure associated with a second cell. Additionally, the wireless communication device can perform a link failure recovery procedure. This may include prioritizing a first link failure recovery for the first cell over a second link failure recovery for the second cell. Other aspects and features are also claimed and described.

30 Claims, 10 Drawing Sheets

(51) Int. Cl.
*H04W 72/04* (2009.01)
*H04W 80/02* (2009.01)
*H04W 24/10* (2009.01)

(58) Field of Classification Search
CPC ...... H04W 24/04; H04W 76/15; H04L 5/001; H04L 27/0006; H04B 7/0695
See application file for complete search history.

(56) References Cited

U.S. PATENT DOCUMENTS

| | | | | |
|---|---|---|---|---|
| 10,904,940 | B2* | 1/2021 | Zhou | H04W 72/02 |
| 10,911,201 | B2* | 2/2021 | Cheng | H04W 72/0413 |
| 11,006,362 | B2* | 5/2021 | Cheng | H04W 72/0446 |
| 11,095,355 | B2* | 8/2021 | Cirik | H04B 7/0617 |
| 2019/0215136 | A1* | 7/2019 | Zhou | H04B 17/24 |
| 2019/0245737 | A1* | 8/2019 | Zhou | H04L 41/0668 |
| 2019/0254042 | A1* | 8/2019 | Cirik | H04W 74/004 |
| 2020/0052769 | A1* | 2/2020 | Cirik | H04W 80/02 |
| 2020/0107331 | A1* | 4/2020 | Tsai | H04W 72/085 |
| 2020/0145280 | A1* | 5/2020 | Cirik | H04W 72/14 |
| 2021/0021329 | A1* | 1/2021 | Zhang | H04B 7/088 |
| 2021/0044342 | A1* | 2/2021 | He | H04W 80/02 |
| 2021/0044344 | A1* | 2/2021 | Jiang | H04W 76/19 |
| 2021/0058998 | A1* | 2/2021 | Yuan | H04W 72/0413 |
| 2021/0099216 | A1* | 4/2021 | Takeda | H04W 24/08 |
| 2021/0105765 | A1* | 4/2021 | Cirik | H04W 52/146 |
| 2021/0127445 | A1* | 4/2021 | da Silva | H04W 76/30 |
| 2021/0144794 | A1* | 5/2021 | Zhou | H04W 72/046 |
| 2021/0159967 | A1* | 5/2021 | Cirik | H04W 80/02 |
| 2021/0160953 | A1* | 5/2021 | Mildh | H04W 68/005 |
| 2021/0377920 | A1* | 12/2021 | Yan | H04W 72/042 |

OTHER PUBLICATIONS

OPPO: "MAC Impacts on Supporting BFR Procedure on SCell", 3GPP Draft, 3GPP TSG-RAN2 Meeting #102, R2-1807415—MAC Impacts on Supporting BFR Procedure on SCell, 3rd Generation Partnership Project (3GPP), Mobile Competence Centre, 650, Route Des Lucioles, F-06921 Sophia-Antipolis Cedex, vol. RAN WG2, No. Busan, Korea, May 21, 2018-May 25, 2018, May 20, 2018 (May 20, 2018), XP051443812, pp. 1-5, Retrieved from the Internet: URL: http://www.3gpp.org/ftp/Meetings%5F3GPP%5FSYNC/RAN2/Docs/, [retrieved on May 20, 2018], Sections 1-4.

Spreadtrum Communications: "Beam Failure Recovery on SCell", 3GPP Draft, 3GPP TSG-RAN WG2 Meeting #101bis, R2-1804475 Beam Failure Recovery on SCell, 3rd Generation Partnership Project (3GPP), Mobile Competence Centre, 650, Route Des Lucioles, F-06921 Sophia-Antipolis Cedex, France, vol. RAN WG2, No. Sanya, China, Apr. 16, 2018-Apr. 20, 2018, Apr. 14, 2018 (Apr. 14, 2018), XP051428211, 2 Pages, Retrieved from the Internet: URL: http://www.3gpp.org/ftp/Meetings%5F3GPP%5FSYNC/RAN2/Docs/, [retrieved on Apr. 14, 2018], Sections 1-3.

3GPP TSG RAN WG1 meeting #92 bis R1-1805730 Sanya, China, Apr. 16-20, 2018, Agenda Item: 7.1.2.2.4, Source: Mediatek Inc. Title: Summary 3 on Remaining Issues on Beam Failure Recovery, Document for: Discussion, Proposals 1-22.

* cited by examiner

LINK FAILURE RECOVERY PROCEDURE FOR A PRIMARY CELL (PCELL) AND A SECONDARY CELL (SCELL)

CROSS REFERENCE TO RELATED APPLICATIONS & PRIORITY CLAIM

The present application claims priority to and the benefit of U.S. Provisional Patent Application No. 62/826,921 filed Mar. 29, 2019, which is hereby incorporated by reference in its entirety as if fully set forth below and for all applicable purposes.

TECHNICAL FIELD

This application relates to wireless communication systems, and more particularly to improving the processing of link failures associated with a primary cell (PCell) and a secondary cell (SCell) among eNBs and user equipments (UEs). Various embodiments can enable and provide solutions and techniques for improving resource utilization efficiency and handling link failures when both the PCell and the SCell have failed (e.g., via a consistent approach and mechanism for handling link failures).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR-unlicensed (NR-U) may refer to the deployment of an NR cell in an unlicensed spectrum. For example, an NR cell may be deployed in a standalone NR-U mode over one or more unlicensed frequency bands. NR-U may also support cell deployments using various combinations of unlicensed bands and licensed bands. For example, an NR cell may be deployed using carrier aggregation to combine an NR licensed band with an NR unlicensed band, where the NR licensed band may function as an anchor carrier or a primary cell (PCell) and the unlicensed band may function as a supplemental carrier or a secondary cell (SCell). The SCell may include an uplink (UL) component carrier and a downlink (DL) component carrier. Alternatively, the SCell may include a DL component carrier only. In another example, an NR cell may be deployed using dual connectivity between an LTE licensed band and an NR unlicensed band, where the LTE licensed band may function as a PCell and the NR unlicensed band may function as a SCell. In yet another example, an NR cell may be deployed in a DL unlicensed band and a UL licensed band.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes detecting, by a wireless communication device, a first link failure associated with a primary cell (PCell). The wireless communication device may detect a second link failure associated with a secondary cell (SCell). The wireless communication device may perform a link failure recovery procedure by prioritizing a first link failure recovery for the PCell over a second link failure recovery for the SCell. The second link failure may be detected before the first link failure recovery has completed.

In an additional aspect of the disclosure, a method of wireless communication includes receiving, by a wireless communication device, a first link failure recovery request associated with a primary cell (PCell). The first link failure recovery request may be associated with a first link failure recovery for the PCell. The wireless communication device may receive a second link failure recovery request associated with a secondary cell (SCell). The second link failure recovery request may be associated with a second link failure recovery for the SCell. The wireless communication device may perform a link failure recovery procedure by prioritizing the first link failure recovery for the PCell over the second link failure recovery for the SCell. The first link failure recovery request may be communicated before the second link failure recovery has completed.

In an additional aspect of the disclosure, an apparatus includes a processor configured to detect a first link failure associated with a PCell and configured to detect a second link failure associated with an SCell. The processor may be further configured to perform a link failure recovery procedure by prioritizing a first link failure recovery for the PCell over a second link failure recovery for the SCell. The second link failure may be detected before the first link failure recovery has completed.

In an additional aspect of the disclosure, an apparatus includes a receiver configured to receive a first link failure recovery request associated with a PCell and further configured to receive a second link failure recovery request associated with an SCell. The first link failure recovery request may be associated with a first link failure recovery for the PCell. The second link failure recovery request may be associated with a second link failure recovery for the SCell. The apparatus may further include a processor configured to perform a link failure recovery procedure by prioritizing the first link failure recovery for the PCell over the second link failure recovery for the SCell. The first link failure recovery request may be received before the second link failure recovery has completed.

In an additional aspect of the disclosure, a computer-readable medium having program code recorded thereon includes code for causing a UE to detect a first link failure associated with a PCell. The program code may include code for causing the UE to detect a second link failure associated with an SCell. The program code may include code for causing the UE to perform a link failure recovery procedure by prioritizing a first link failure recovery for the PCell over a second link failure recovery for the SCell. The second link failure may be detected before the first link failure recovery has completed.

In an additional aspect of the disclosure, a computer-readable medium having program code recorded thereon includes code for causing a BS to receive a first link failure recovery request associated with a PCell. The first link failure recovery request may be associated with a first link failure recovery for the PCell. The program code may include code for causing the BS to receive a second link failure recovery request associated with an SCell. The second link failure recovery request may be associated with a second link failure recovery for the SCell. The program code may include code for causing the BS to perform a link failure recovery procedure by prioritizing the first link failure recovery for the PCell over the second link failure recovery for the SCell. The first link failure recovery request may be received before the second link failure recovery has completed.

In an additional aspect of the disclosure, an apparatus includes means for detecting, by a wireless communication device, a first link failure associated with a PCell. The apparatus may include means for detecting, by the wireless communication device, a second link failure associated with an SCell. The apparatus may include means for performing, by the wireless communication device, a link failure recovery procedure by prioritizing a first link failure recovery for the PCell over a second link failure recovery for the SCell. The second link failure may be detected before the first link failure recovery has completed.

In an additional aspect of the disclosure, an apparatus includes means for receiving, by a wireless communication device, a first link failure recovery request associated with a PCell. The first link failure recovery request may be associated with a first link failure recovery for the PCell. The apparatus may include means for receiving a second link failure recovery request associated with an SCell. The second link failure recovery request may be associated with a second link failure recovery for the SCell. The apparatus may include means for performing, by the wireless communication device, a link failure recovery procedure by prioritizing the first link failure recovery for the PCell over the second link failure recovery for the SCell. The first link failure recovery request may be received before the second link failure recovery has completed.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
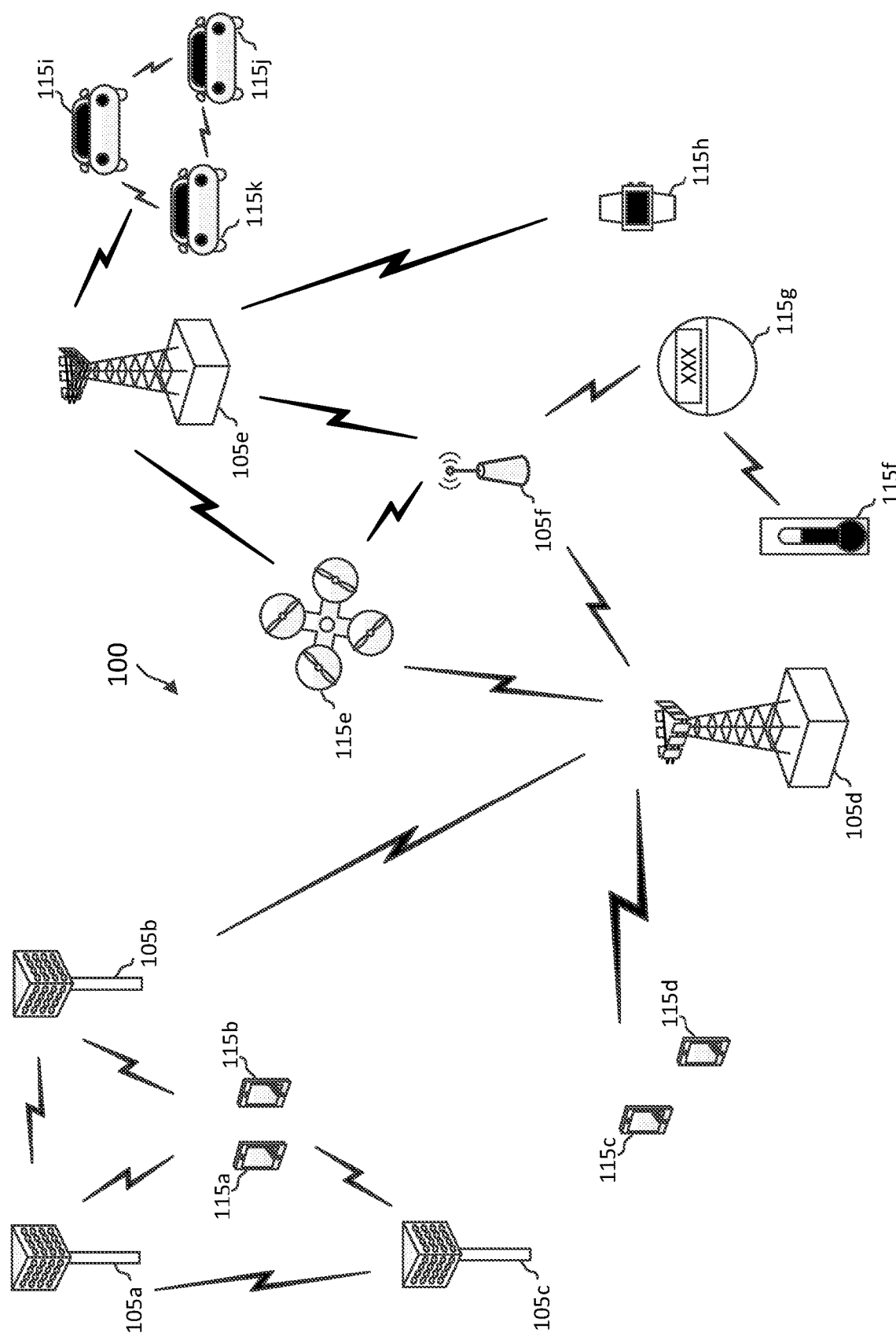
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). The "3rd Generation Partnership Project" (3GPP) Long Term Evolution (LTE) and LTE-Advanced (LTE-A) are new releases of UMTS that use E-UTRA. UTRA, E-UTRA, UMTS, LTE, LTE-A and GSM are described in documents from an organization named the "3rd Generation Partnership Project." CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G)) network.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive Multiple Input-Multiple Output (MIMO). The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115/ communicating temperature measurement information to the smart meter, the UE 115g, which is then reported to the network through the small cell BS 105/. The network 100 may also provide additional network efficiency through dynamic, low-latency TDD/frequency-division duplexing (FDD) communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of transmission time intervals (TTIs) may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. After establishing the connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some embodiments, the BS 105 can coordinate with the UE 115 to cooperatively schedule, beamform, and/or transmit data in the network 100. In some examples, the network 100 may be an LTE network. In some examples, the network 100 may be an NR network. Beamforming may be used to avoid transmission losses when using, for example, mmWave frequencies. Beamforming combines signals from multiple antenna elements in an antenna array, so that the combined signal level increases when several signal phases align (constructive interference). The signals from each antenna element are transmitted with a slightly different phase (delay) to produce a beam directed towards the receiver.

Beam management operations may be based on a variety of signals/messages. As one example, beam management operations can be based on control messages periodically exchanged (e.g., between transmitter and receiver nodes). Beamforming techniques may be used to increase the signal level received by a device. A beamformer combines energy over its aperture, obtaining a certain antenna gain in a given direction while having attenuation in others. Each of the BS 105 and the UE 115 may steer its energy in a particular direction. The BS 105 may transmit a plurality of beams corresponding to a beam sector having an angle. In an example, the angle is 120 degrees, and thus the plurality of beams covers a 120-degree sector. The angle may be an angle of departure from the BS 105 to a dominant cluster in the channel. Each beam sector may correspond to different angles.

The UE 115's direction may be focused towards the same corresponding dominant cluster in the channel as that mentioned for the BS 105. The UE 115 may be designed with a plurality of subarrays, and each subarray includes an array of antennas (e.g., four antennas). A "subarray" may also be referred to as an "array" in the present disclosure. Each subarray of the plurality of subarrays may be located on different edges of the UE 115, thus creating diversity and providing for directional communication. The BS 105 and the UE 115 may perform beam discovery and agree on a best beam pair for UL and/DL transmissions. The BS 105 selects a beam from the plurality of beams as having the largest receive signal power compared to the other beams of the plurality of beams, and the UE 115 selects a subarray of the plurality of subarrays as having the largest receive signal power compared to the other subarrays of the plurality of subarrays. The UE 115 may select a beam of the subarray as having the largest receive signal power compared to the other beams of the subarray. The BS 105's selected UL beam and the UE 115's selected DL beam may be referred to as a beam pair. The BS 105 and the UE 115 may perform beam refinement of the BS 105's selected beam with the UE 115's selected beam. The BS 105 and UE 115 may communicate DL and/or UL information using the selected beam pair. In an example, the BS 105 may transmit the DL information and the UE 115 may receive the DL information using the selected beam pair.

The BS 105 and the UE 115 may communicate using selected beam pairs via a PCell and an SCell. Additionally, the BS 105 and the UE 115 may exchange reference signals for receive signal power measurements. The receive signal powers can be, for example, reference signal receive powers (RSRPs). The UE 115 may monitor the beam quality in the PCell and the SCell to ensure that reference signals received from the BS 105 via the PCell or the SCell are high-quality signals. A measurement of a high-quality signal is over a quality threshold (e.g., RSRP threshold). An example of an RSRP threshold may be 10 dB.

In some examples, the UE 115 may detect link failures associated with at least one of the PCell or the SCell. A link failure may be a beam failure or a radio link failure. A beam failure may refer to a failure in communications between the UE 115 and the BS 105 using a particular UL beam and/or DL beam, but the connection between the BS 105 and the UE 115 is maintained. A radio link failure may refer to a disconnection between the BS 105 and the UE 115.

Figure 2:
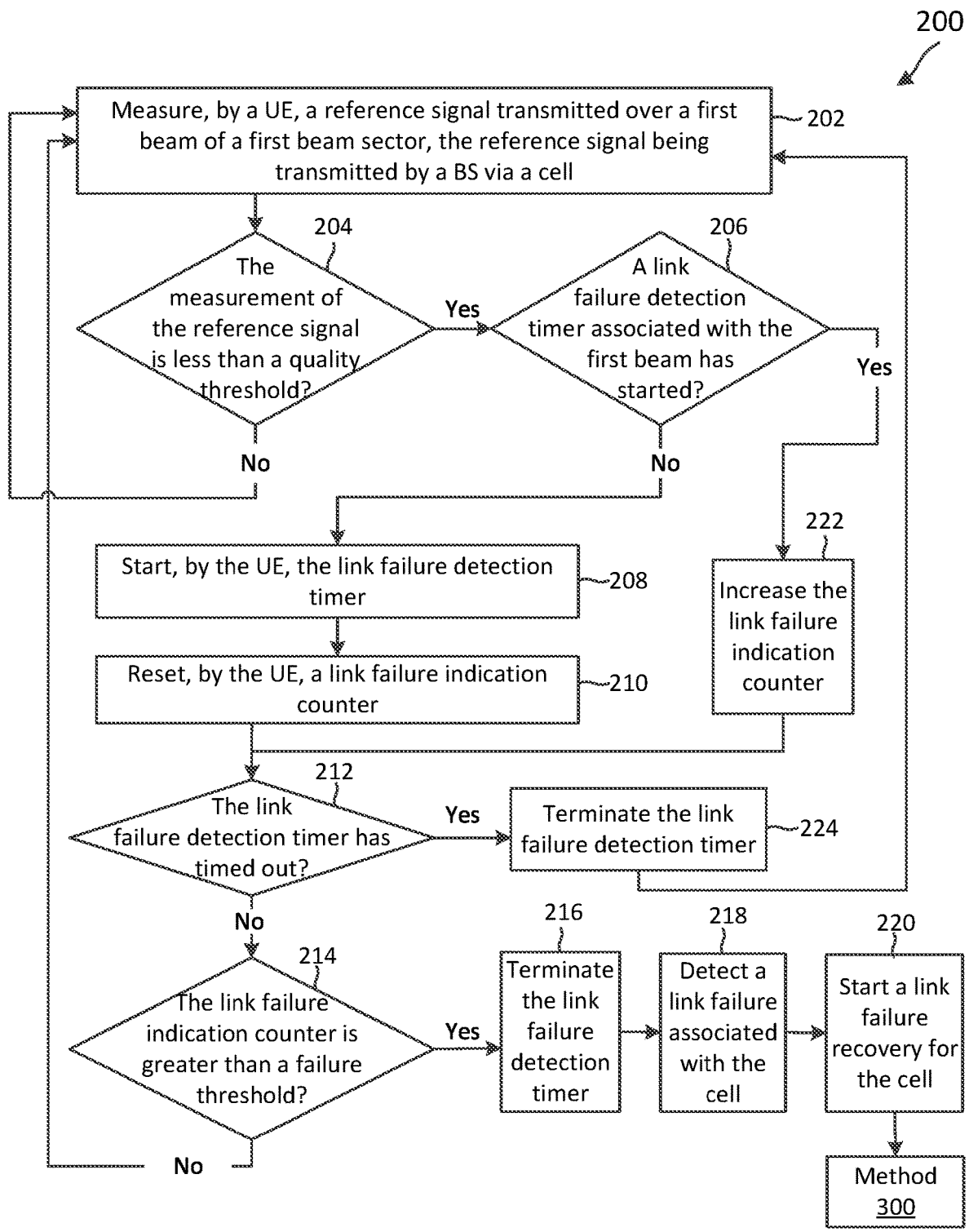
FIG. 2 is a flow diagram of a method of wireless communication for detecting a link failure associated with a cell according to some embodiments of the present disclosure.

FIG. 2 is a flow diagram of a method 200 of wireless communication for detecting a link failure associated with a cell according to some embodiments of the present disclosure. Steps of the method 200 can be executed by a computing device (e.g., a processor, processing circuit, and/or other suitable component) of a wireless communication device, such as the UE 115. As illustrated, the method 200 includes a number of enumerated steps, but embodiments of the method 200 may include additional steps before, after, and in between the enumerated steps. In some embodiments, one or more of the enumerated steps may be omitted or performed in a different order.

At step 202, the method 200 includes measuring, by a UE (e.g., UE 115), a reference signal transmitted over a first beam of a first beam sector, the reference signal being transmitted by a BS via a cell. The cell may be a PCell or an SCell. The UE 115 includes a physical layer and a medium access control (MAC) layer. In an example, the physical layer of the UE 115 may detect the reference signal and measure the reference signal (e.g., by measuring an RSRP of the reference signal).

At step 204, the method 200 includes determining whether the measurement of the reference signal is less than a quality threshold. If the reference signal is not less than the quality threshold, the reference signal is a high-quality signal and the process flow of the method 200 may proceed back to step 202, in which the UE measures another reference signal. If the reference signal is less than the quality threshold, the reference signal is a poor-quality signal and the UE 115 may execute further actions to determine whether a link failure has occurred in the cell. A link failure may be a beam failure or a radio link failure. The UE 115 may attempt to recover from a beam failure by selecting another beam for communicating with the BS 105. If a radio link failure occurs, the UE 115 and the BS 105 have been disconnected. Accordingly, a radio link failure is considered a higher level of failure than a beam failure. After step 204, the process flow of the method 200 may proceed to step 206.

At step 206, the method 200 includes determining whether a link failure detection timer associated with the first beam has started. In an example, the MAC layer of the UE 115 may determine whether the link failure detection timer associated with the first beam has started. If the link failure detection timer associated with the first beam has not started, the UE 115 has not detected a low-quality signal associated with the first beam within the link failure detection timer period. In this example, the process flow of the method 200 may proceed to step 208.

At step 208, the method 200 includes starting, by the UE, the link failure detection timer. The link failure detection timer may increase with the passage of time until the link failure detection timer expires or times out. In an example, if the reference signal is less than the quality threshold, the physical layer of the UE 115 transmits an out-of-service indication to the MAC layer of the UE 115. In response to detecting the out-of-service indication and in response to a determination that the link failure detection timer associated with the first beam has not started, the MAC layer of the UE 115 may start the link failure detection timer.

At step 210, the method 200 includes resetting, by the UE, a link failure indication counter. The UE may count the number of detected low-quality beams within a beam failure detection time period. Before the link failure detection timer has timed out, if the UE 115 counts a number of low-quality signals associated with a first beam up to a certain link failure threshold, the UE 115 may declare a beam failure. In this example, the UE 115 may determine that the beam is no longer a good beam over which to transmit or receive signals.

At step 212, the method 200 includes determining whether the link failure detection timer has timed out. If the link failure detection timer has not timed out, the process flow of the method 200 may proceed to step 214.

At step 214, the method 200 includes determining whether the link failure indication counter is greater than the failure threshold. If the link failure indication counter is not greater than the failure threshold, the UE 115 may continue to measure reference signals transmitted by the BS 105 over the beam and count the number of times the reference signal measurement is less than the quality threshold. In this example, the process flow of the method 200 may proceed back to step 202, in which the UE measures another reference signal. If the link failure indication counter is greater than the failure threshold, the UE 115 has encountered enough low-quality signals within a time period set by the link failure detection timer to determine whether a link failure has occurred. In this example, the process flow of the method 200 may proceed to step 216.

At step 216, the method 200 includes terminating the link failure detection timer. The UE 115 may terminate a timer by stopping and/or resetting the timer. After the link failure detection timer associated with the first beam has been terminated, no link failure detection timer associated with the first beam has started.

At step 218, the method 200 includes detecting a link failure associated with the cell. The link failure may be a beam failure. In an example, in response to a determination that the link failure indication counter is greater than the failure threshold, the MAC layer of the UE 115 detects the link failure associated with the cell. In this example, the MAC layer of the UE 115 has counted a particular number of times in which the reference signal is a low-quality signal, and accordingly the UE 115 may determine that a link failure (a beam failure for the particular beam) in the cell has occurred.

At step 220, the method 200 includes starting a link failure recovery for the cell. In some examples, after step 220, the UE 115 may execute steps of method 300 in FIG. 3.

Referring back to step 206, if the link failure detection timer associated with the beam has started, the process flow of the method 200 may proceed to step 222. At step 222, the method 200 includes increasing the link failure indication counter. In an example, the UE 115 maintains a count of the number of times the UE 115 has measured a reference signal that is of low-quality (e.g., less than the quality threshold). The UE 115 may continue to do so until the link failure detection timer times out and/or when the link failure indication counter reaches the failure threshold.

After step 222, the process flow of the method 200 may proceed to step 212, in which it is determined whether the link failure detection timer has timed out. If the link failure detection timer has timed out, the process flow of the method 200 may proceed to step 224. At step 224, the method 200 includes terminating the link failure detection timer. In an example, the UE 115 has not counted enough low-quality signals before the link failure detection timer has expired to determine that a link failure in the cell has occurred. After step 224, the process flow of the method 200 may proceed back to step 202, in which the UE measures another reference signal.

Figure 3:
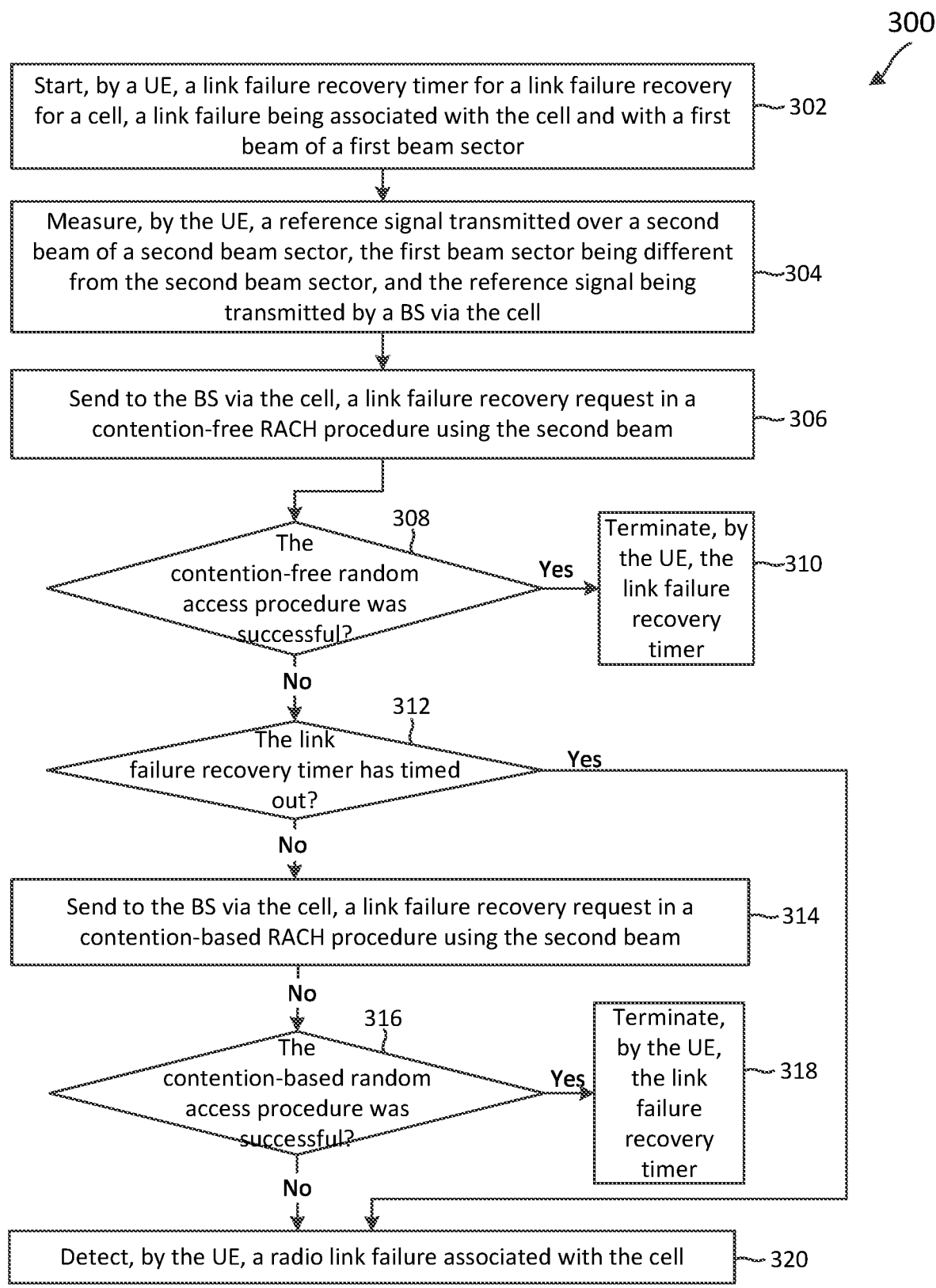
FIG. 3 is a flow diagram of a method of wireless communication for performing a link failure recovery for a cell (e.g., a PCell or an SCell) according to some embodiments of the present disclosure.

FIG. 3 is a flow diagram of a method 300 of wireless communication for performing a link failure recovery for a cell (e.g., a PCell or an SCell) according to some embodiments of the present disclosure. The link recovery may be a recovery from a beam failure or from a radio link failure. Steps of the method 300 can be executed by a computing device (e.g., a processor, processing circuit, and/or other suitable component) of a wireless communication device, such as the UE 115. As illustrated, the method 300 includes a number of enumerated steps, but embodiments of the method 300 may include additional steps before, after, and in between the enumerated steps. In some embodiments, one or more of the enumerated steps may be omitted or performed in a different order.

At step 302, the method 300 includes starting, by a UE (e.g., UE 115), a link failure recovery timer. This can be, for example, for a link failure recovery for a cell, a link failure being associated with the cell and with a first beam of a first beam sector. In an example, the MAC layer of the UE 115 starts the link failure recovery timer if a link failure indication counter associated with a first beam is greater than a failure threshold (see step 214 in FIG. 2).

At step 304, the method 300 includes measuring, by the UE, a reference signal transmitted over a second beam of a second beam sector, the first beam sector being different from the second beam sector, and the reference signal being transmitted by a BS via the cell. In an example, the first beam of the first beam sector did not provide high-quality signals. Accordingly, a link failure recovery may include the UE 115 selecting the second beam of the second sector for communicating signals with the BS 105. In an example, the physical layer of the UE 115 measures the reference signal associated with the second beam, and the MAC layer of the UE 115 sends a request to the physical layer for the measurement of the reference signal associated with the second beam. The physical layer receives the request and transmits a report including the measurement of the reference signal associated with the second beam to the MAC layer.

At step 306, the method 300 includes sending to the BS via the cell, a link failure recovery request in a contention-free RACH procedure using the second beam. In an example, the BS may configure the UE with a contention-free resource including the second beam and a certain RACH preamble sequence for performing the contention-free RACH procedure.

At step 308, the method 300 includes determining whether the contention-free RACH procedure was successful. The MAC layer of the UE 115 may search for a PDCCH associated with a response for the link failure recovery request from the BS 105 until the PDCCH is received or until a first-time window expires. The PDCCH may be scrambled by a cell-Radio Network Temporary Identifier (C-RNTI). If the physical layer of the UE 115 does not receive the PDCCH before the first-time window expires, the MAC layer of the UE 115 may determine that the contention-free RACH procedure was not successful. If the physical layer of the UE 115 receives the PDCCH before the first-time window expires, the MAC layer of the UE 115 may determine that the contention-free RACH procedure was successful.

If the contention-free RACH procedure was successful, the UE 115 may determine that a link failure in the cell has not occurred and continue to receive and/or transmit using the second beam (rather than the first beam). In this example, the process flow of the method 300 may proceed to step 310. At step 310, the method 300 includes terminating, by the UE, the link failure recovery timer.

If the contention-free RACH procedure was not successful, the process flow of the method 300 may proceed to step 312. At step 312, the method 300 includes determining, by the UE, whether the link failure recovery timer has timed out. If the link failure recovery timer has not timed out, the process flow of the method 300 may proceed to step 314.

At step 314, the method 300 includes sending to the BS via the cell, a link failure recovery request in a contention-based RACH procedure using the second beam or any other beam in the second sector. At step 316, the method 300 includes determining whether the contention-based RACH procedure was successful. The MAC layer of the UE 115 may search for a PDCCH associated with a response for the link failure recovery request from the BS 105 until the PDCCH is received or until a second-time window expires. The first-time window may be different from or the same as the second-time window. The PDCCH may be scrambled by a cell-Radio Network Temporary Identifier (C-RNTI). If the physical layer of the UE 115 does not receive the PDCCH before the second-time window expires, the MAC layer of the UE 115 may determine that the contention-based RACH procedure was not successful. If the physical layer of the UE 115 receives the PDCCH before the second-time window expires, the MAC layer of the UE 115 may determine that the contention-based RACH procedure was successful.

If the contention-based RACH procedure was successful, the UE 115 may determine that a link failure in the cell has not occurred and the process flow of the method 300 may proceed to step 318. At step 318, the method 300 includes terminating, by the UE, the link failure recovery timer.

If the contention-based RACH procedure was not successful, the process flow of the method 300 may proceed to step 320. At step 320, the method 300 includes detecting, by the UE, a radio link failure associated with the cell. If a radio link failure is detected, the UE 115 may determine that the UE 115 has been disconnected from the BS 105.

Referring back to step 312, if the link failure recovery timer has timed out, enough time has passed for the UE 115 to detect a link failure in the cell. In this example, the process flow of the method 300 may proceed to step 320. If the UE 115 detects a link failure (e.g., a beam failure or a radio link failure) in a cell, the UE 115 may perform actions for handling the link failure.

Figure 4:
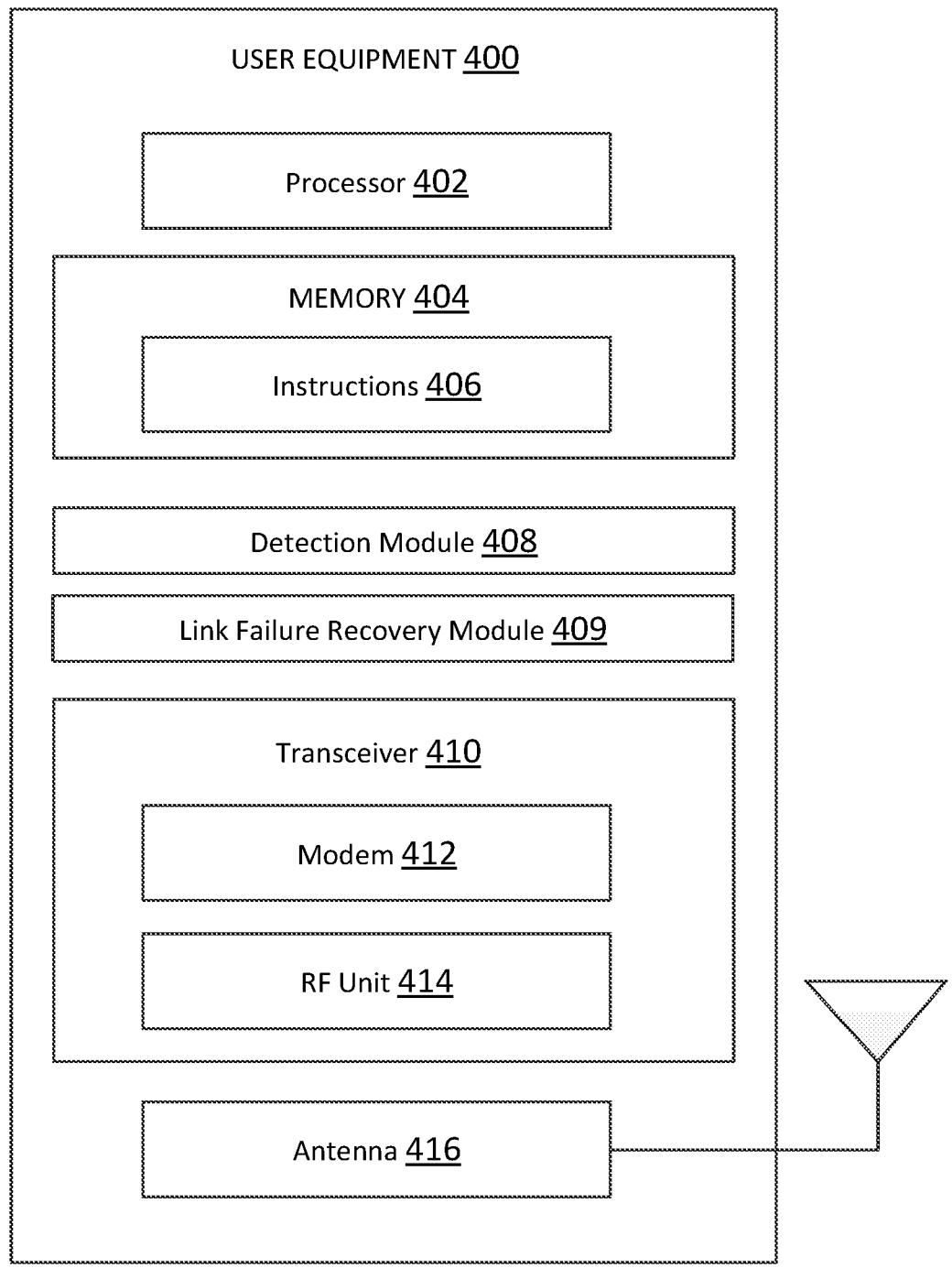
FIG. 4 is a block diagram of a user equipment (UE) according to some embodiments of the present disclosure.

FIG. 4 is a block diagram of a UE 400 according to some embodiments of the present disclosure. The UE 400 may be a UE 115 as discussed above. As shown, the UE 400 may include a processor 402, a memory 404, a detection module 408, a link failure recovery module 409, a transceiver 410 including a modem subsystem 412 and an RF unit 414, and an antenna 416. These elements may be in direct or indirect communication with each other, for example, via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The detection module 408 and/or link failure recovery module 409 may be used for various aspects of the present disclosure. For example, the detection module 408 is configured to detect a first link failure associated with a PCell. In an example, the detection module 408 may execute the method 200 for detecting a link failure in the PCell. The detection module 408 is configured to detect a second link failure associated with an SCell. In an example, the detection module 408 may execute the method 200 for detecting a link failure in the SCell.

In some examples, the detection module 408 detects a link failure in the PCell before detecting a link failure in the SCell. In some examples, the detection module 408 detects a link failure in the PCell before detecting a link failure in the SCell. In any case, the UE 400 may experience link failures in both the PCell and SCell for a duration of time. The link failure recovery module 409 is configured to perform a link failure recovery procedure by prioritizing a first link failure recovery for the PCell over a second link failure recovery for the SCell, the second link failure being detected before the first link failure recovery has completed.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the detection module 408 and/or link failure recovery module 409 according to a modulation and coding scheme (MCS), e.g., a low-density parity check (LDPC) coding scheme, a turbo coding scheme, a convolutional coding scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. Although shown as integrated together in transceiver 410, the modem subsystem 412 and the RF unit 414 may be separate devices that are coupled together at the UE 115 to enable the UE 115 to communicate with other devices.

The RF unit 414 may provide modulated and/or processed data, e.g. data packets (or, more generally, data messages that may contain one or more data packets and other information), to the antenna 416 for transmission to one or more other devices. The antenna 416 may further receive data messages transmitted from other devices. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
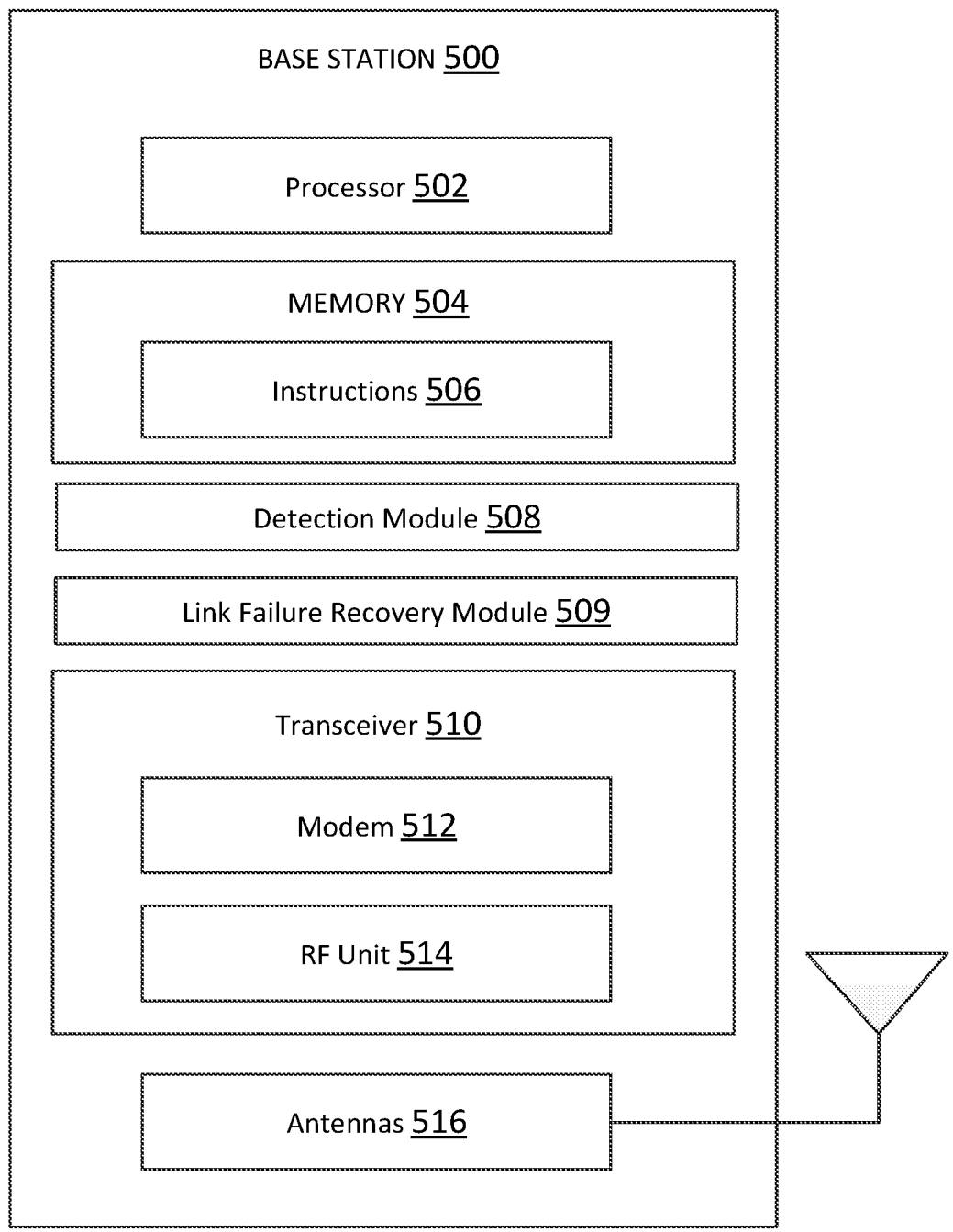
FIG. 5 illustrates a block diagram of an exemplary base station (BS) according to some embodiments of the present disclosure.

FIG. 5 illustrates a block diagram of an exemplary BS 500 according to some embodiments of the present disclosure. The BS 500 may be a BS 105 as discussed above. A shown, the BS 500 may include a processor 502, a memory 504, a detection module 508, a link failure recovery module 509, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 4.

The detection module 508 and/or link failure recovery module 509 may be used for various aspects of the present disclosure. For example, the detection module 508 is configured to detect a first link failure associated with a PCell. In an example, the detection module 508 may detect the first link failure in response to receiving a link failure recovery request associated with the PCell from the UE 115.

The detection module 508 is configured to detect a second link failure associated with an SCell. In an example, the detection module 508 may detect the second link failure in response to receiving a link failure recovery request associated with the SCell from the UE 115. In some examples, the detection module 508 may detect that first and second link failures in response to receiving a dedicated preamble for the PCell RACH indicating that both the PCell and the SCell have failed.

The link failure recovery module 509 is configured to perform a link failure recovery procedure by prioritizing a first link failure recovery for the PCell over a second link failure recovery for the SCell, the second link failure being detected before the first link failure recovery has completed.

As shown, the transceiver 510 may include the modem subsystem 512 and the RF unit 514. The transceiver 510 can be configured to communicate bi-directionally with other devices, such as the UEs 115 and/or another core network element. In an example, the transceiver 510 may transmit reference signals to the UE 115 via the PCell or the SCell using one or more beams. The modem subsystem 512 may be configured to modulate and/or encode data from the memory 504, the detection module 508 and/or link failure recovery module 509 according to a MCS, e.g., a LDPC coding scheme, a turbo coding scheme, a convolutional coding scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped UE 102 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
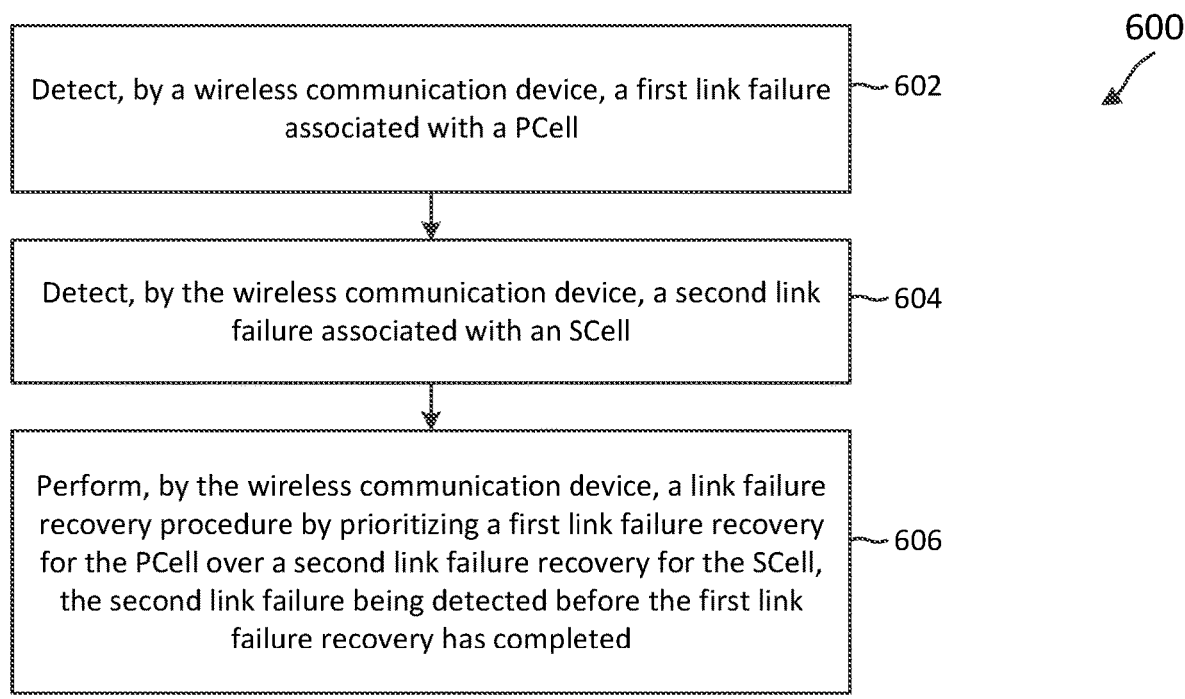
FIG. 6 is a flow diagram of a method of wireless communication for handling link failures associated with the PCell and/or SCell according to some embodiments of the present disclosure.

FIG. 6 is a flow diagram of a method 600 of wireless communication for handling link failures associated with the PCell and/or SCell according to some embodiments of the present disclosure. Steps of the method 600 can be executed by a computing device (e.g., a processor, processing circuit, and/or other suitable component) of a wireless communication device, such as the UE 115 or the UE 400. As illustrated, the method 600 includes a number of enumerated steps, but embodiments of the method 600 may include additional steps before, after, and in between the enumerated steps. In some embodiments, one or more of the enumerated steps may be omitted or performed in a different order.

At step 602, the method 600 includes detecting, by a wireless communication device, a first link failure associated with a PCell. In an example, the wireless communication device is the UE 115, which may detect the first link failure in accordance with the method 200 (see step 218 in FIG. 2 or step 320 in FIG. 3). The first link failure recovery may refer to the UE 115 executing the method 300 for the PCell. In another example, the wireless communication device is the BS 105, which may detect the first link failure in response to receiving a link failure recovery request for the PCell from the UE 115. The first link failure recovery may refer to the BS 105 transmitting PDCCH (e.g., a UE-specific schedule) for a link recovery response to the UE 115 in response to the link failure recovery request for the PCell. The BS 105 may subsequently transmit a link recovery response to the UE based on the schedule.

At step 604, the method 600 includes detecting, by the wireless communication device, a second link failure associated with an SCell. In an example, the wireless communication device is the UE 115, which may detect the second link failure in accordance with the method 200 (see step 218 in FIG. 2 or step 320 in FIG. 3). The second link failure recovery may refer to the UE 115 executing the method 300 for the SCell. The UE 115 communicates with the BS 105 via the PCell and/or the SCell. In another example, the wireless communication device is the BS 105, which may detect the second link failure in response to receiving a link failure recovery request for the SCell from the UE 115. The UE 115 may measure certain reference signals (e.g., SRS). The second link failure recovery may refer to the BS 105 transmitting a PDCCH (schedule) for a link failure recovery response and subsequently the link failure recovery response) to the UE 115 in response to the link failure recovery request for the SCell.

At step 606, the method 600 includes performing, by the wireless communication device, a link failure recovery procedure by prioritizing a first link failure recovery for the PCell over a second link failure recovery for the SCell, the second link failure being detected before the first link failure recovery has completed. In an example, the wireless communication device is the UE 115, which may initiate the first link failure recovery by sending a link failure recovery request to the BS 105 via the PCell. Additionally, the UE may initiate the second link failure recovery by sending a link failure recovery request to the BS 105 via the SCell. The UE 115 may prioritize the first link failure recovery for the PCell over a second link failure recovery for the SCell by performing actions discussed in the present disclosure (see FIGS. 7-9). For example, the UE 115 may stop or terminate the second link failure recovery in order to initiate and/or complete the first link failure recovery.

In some examples, the UE 115 may detect the first link failure associated with the PCell and the second link failure associated with the SCell. The second link failure of the SCell may coincide with the first link failure of the PCell. During the first link failure recovery, the UE 115 may send a RACH preamble to the BS 105 via the PCell. During the second link failure recovery, the UE 115 may send a RACH preamble to the BS 105 via the SCell. If the second link failure is detected before the first link failure recovery has completed for the PCell, then the UE 115 may handle both the first and second link failure recoveries at the same time. For example, the UE 115 may terminate the second link failure recovery and restart another second link recovery after completing the first link recovery. Alternatively, the UE 115 may pause the second link failure recovery and resume the second link recovery after completing the first link recovery.

Figure 7:
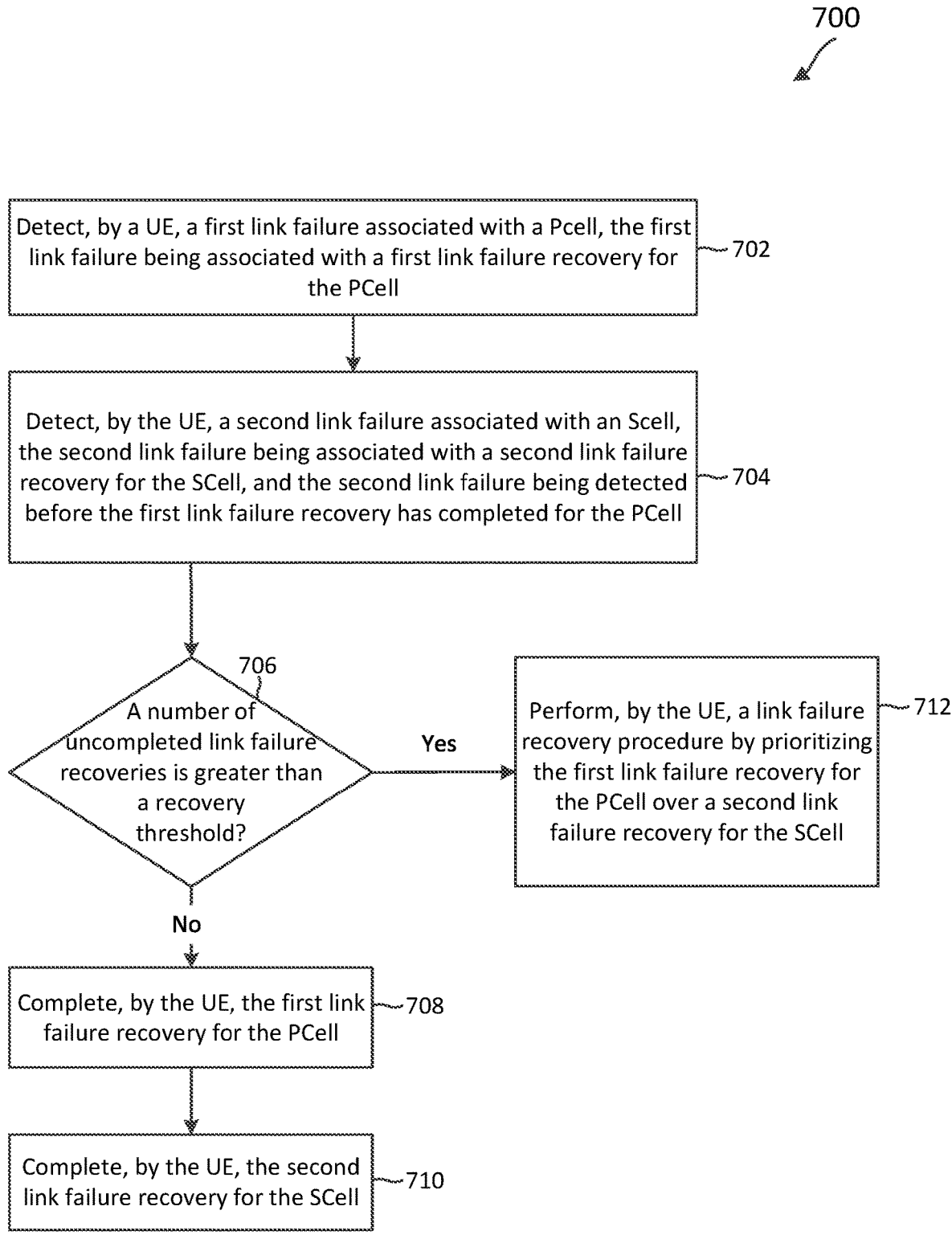
FIG. 7 is a flow diagram of a method of wireless communication for handling link failures associated with the PCell and SCell according to some embodiments of the present disclosure.
Figure 8:
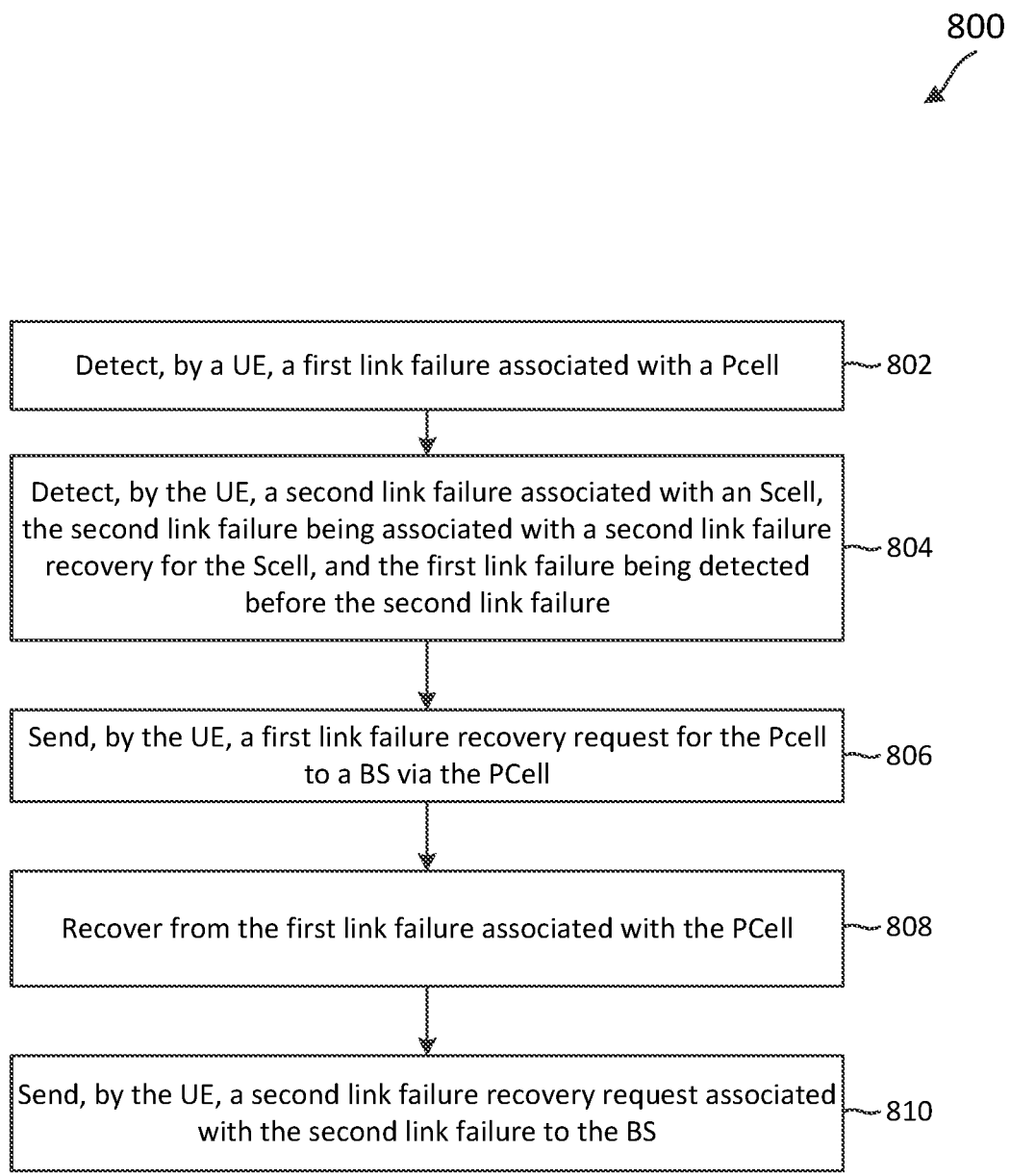
FIG. 8 is a flow diagram of a method of wireless communication for prioritizing the link failure recovery for the PCell over the link failure recovery for the SCell according to some embodiments of the present disclosure.
Figure 9:
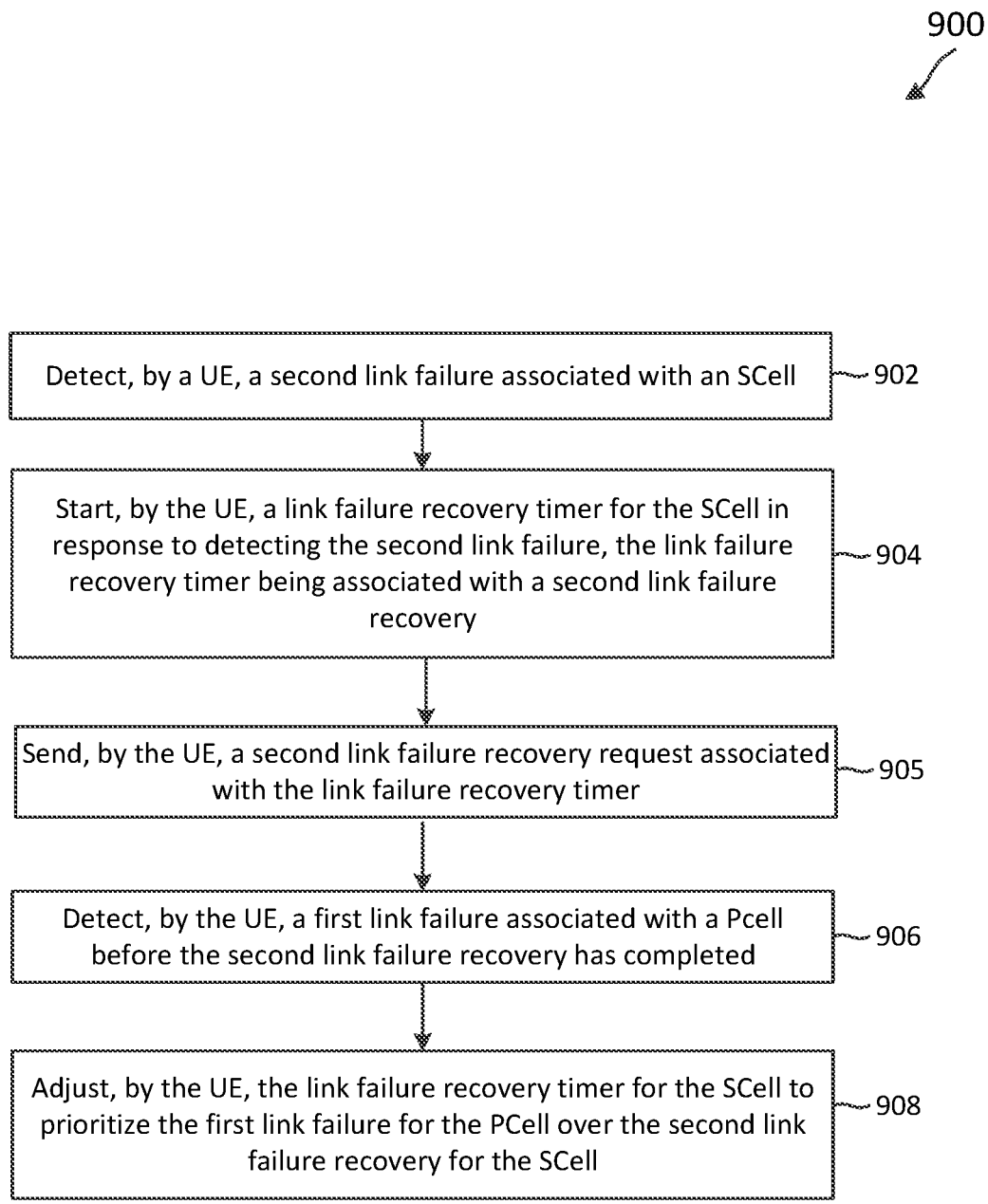
FIG. 9 is a flow diagram of a method of wireless communication for prioritizing the link failure recovery for the PCell over the link failure recovery for the SCell according to some embodiments of the present disclosure.

The present disclosure provides techniques for a UE (e.g., UE 115 in FIG. 1) to indicate a link failure in an SCell via the SCell or via the PCell. FIGS. 7-9 provide techniques for handling link failures in both the PCell and the SCell when the UE 115 performs a link failure recovery for the SCell via the SCell (e.g., sending a link failure recovery request in a contention-free RACH procedure or in a contention-based RACH procedure). The UE 115 may perform a RACH procedure (e.g., a contention-free RACH procedure and/or a contention-based RACH) for the PCell and a RACH procedure (e.g., a contention-free RACH procedure and/or a contention-based RACH) for the SCell. A time period during which the first link failure occurs may at least partially overlap with a time period during which the second link failure occurs. A time period during which the first link failure recovery is performed may at least partially overlap with a time period during which the second link failure recovery is performed. In some examples, the MAC layer of the UE 115 may be configured to perform a maximum number of RACH procedures at a time. The maximum number of RACH procedures that the UE 115 is allowed to perform at one time may be referred to as a recovery threshold.

FIG. 7 is a flow diagram of a method 700 of wireless communication for handling link failures associated with the PCell and SCell according to some embodiments of the present disclosure. Steps of the method 700 can be executed by a computing device (e.g., a processor, processing circuit, and/or other suitable component) of a wireless communication device, such as the UE 115 or the UE 400. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 702, the method 700 includes detecting, by a UE, a first link failure associated with a PCell, the first link failure being associated with a first link failure recovery for the PCell. In an example, the UE 115 may detect the first link failure in accordance with the method 200 (see step 218). The first link failure recovery may refer to the UE 115 executing the method 300 for the PCell.

At step 704, the method 700 includes detecting, by a UE, a second link failure associated with an SCell, the second link failure being associated with a second link failure recovery for the SCell, and the second link failure being detected before the first link failure recovery has completed for the PCell. The UE 115 may be in communication with the BS 105 via the PCell and/or the SCell. In an example, the UE 115 may detect the second link failure in accordance with the method 200 (see step 218). The second link failure recovery may refer to the UE 115 executing the method 300 for the SCell.

At step 706, the method 700 includes determining whether a number of uncompleted link failure recoveries is greater than a recovery threshold. In an example, the UE 115 may be configured in accordance with the recovery threshold. In another example, the UE 115 abides by a specification or rule in accordance with the recovery threshold. The number of uncompleted link failure recoveries may be the number of link failures that have been detected, but the link failure recoveries for these detected link failures have not been completed. A link failure recovery for a link failure has been completed, for example, if the UE 115 terminates the associated link failure recovery timer (e.g., in response to determining that a contention-free RACH procedure or a contention-based RACH procedure was successful) or detects a radio link failure associated with the cell.

If the number of uncompleted link failure recoveries is not greater than the recovery threshold, then the UE 115 may process each of the uncompleted link failure recoveries individually or independently from each other. In this example, the process flow of the method 700 may proceed to step 708 and/or step 710. The UE 115 may initiate execution of the step 708 before or after step 710. In an example, the UE 115 may perform the first link failure recovery for the PCell independent from performing the second link failure recovery for the SCell. The UE 115 may initiate and/or complete the first link failure recovery before or after the UE 115 initiates and/or completes the second link failure recovery. Accordingly, the UE 115 may detect a first link failure associated with a first cell (e.g., Pcell or Scell) and detect a second link failure associated with a second cell (e.g., Pcell or Scell). The UE 115 may perform a link failure recovery procedure by prioritizing a first link failure recovery for the first cell over a second link failure recovery for the second cell. In some aspects, the first cell is a PCell, and the second cell is a SCell. In some aspects, the first cell is a SCell, and the second cell is a PCell. As discussed, the UE 115 may detect the second link failure after detecting the first link failure or may detect the first link failure after detecting the second link failure. Execution of a portion of the first link failure recovery may at least partially overlap with a portion of the second link failure recovery.

If the number of uncompleted link failure recoveries is greater than the recovery threshold, then the UE 115 may not be allowed to process each of the uncompleted link failure recoveries individually or independently from each other. In this example, the process flow of the method 700 may proceed to step 712. At step 712, the method 700 includes performing, by the UE, a link failure recovery procedure by prioritizing the first link failure recovery for the PCell over a second link failure recovery for the SCell. For example, if the recovery threshold is one (UE 115 is only allowed to process one RACH procedure at a time) and the UE 115 detects the second link failure associated with the SCell before the first link failure recovery for the PCell has completed, the UE 115 is unable to process both RACH procedures for the PCell and the SCell at the same time. In this example, the UE 115 may prioritize the first link failure recovery for the PCell over the second link failure recovery for the SCell.

FIG. 8 is a flow diagram of a method 800 of wireless communication for prioritizing the link failure recovery for the PCell over the link failure recovery for the SCell according to some embodiments of the present disclosure. Steps of the method 800 can be executed by a computing device (e.g., a processor, processing circuit, and/or other suitable component) of a wireless communication device, such as the UE 115 or the UE 400. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 802, the method 800 includes detecting, by a UE, a first link failure associated with a PCell. The first link failure may be, for example, a beam failure or a radio link failure.

At step 804, the method 800 includes detecting, by the UE, a second link failure associated with an SCell, the first link failure being associated with a first link failure recovery for the PCell, and the first link failure being detected before the second link failure. The UE 115 may be in communication with the BS 105 via the PCell and/or the SCell.

At step 806, the method 800 includes sending, by the UE, a first link failure recovery request for the PCell to the BS 105 via the PCell. In an example, the UE 115 initiates the first link failure recovery by executing one or more steps of method 300 (e.g., step 306 and/or step 314). For example, the UE 115 may select a beam and send the first link failure recovery request in a contention-free RACH procedure using the selected beam. In another example, the UE 115 may select a beam and send the first link failure recovery request in a contention-based RACH procedure using the selected beam.

At step 808, the method 800 includes recovering from the first link failure associated with the PCell. In an example, the UE 115 recovers from the first link failure if the UE 115 receives a PDCCH in response to the first link failure recovery request. In this example, the UE 115 may use the selected beam for transmission and/or reception of signals and data from the BS 105.

At step 810, the method 800 includes sending, by the UE, a second link failure recovery request associated with the second link failure to the BS 105. In an example, the UE 115 may send the second link failure recovery request via the SCell, where the second link failure recovery request indicates that the SCell has failed. A reference to a cell (e.g., PCell or SCell) that has failed may refer to a detected link failure associated with the cell. In another example, the UE 115 may send the second link failure recovery request via the PCell, where the second link failure recovery request indicates that both the PCell and the SCell have failed. In this example, the second link failure recovery request may be a dedicated sequence.

FIG. 9 is a flow diagram of a method 900 of wireless communication for prioritizing the link failure recovery for the PCell over the link failure recovery for the SCell according to some embodiments of the present disclosure. Steps of the method 900 can be executed by a computing device (e.g., a processor, processing circuit, and/or other suitable component) of a wireless communication device, such as the UE 115 or the UE 400. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 902, the method 900 includes detecting, by a UE, a second link failure associated with an SCell. The second link failure may be, for example, a beam failure or a radio link failure.

At step 904, the method 900 includes starting, by the UE, a link failure recovery timer for the SCell in response to detecting the second link failure, the link failure recovery timer being associated with a second link failure recovery. The link failure recovery timer may correspond to step 302 in FIG. 3. The UE 115 may initiate the second link failure recovery by starting the link failure recovery timer for the SCell.

At step 905, the method 900 includes sending, by the UE, a second link failure recovery request associated with the link failure recovery timer. In an example, the UE 115 sends the second link failure recovery request in a contention-free RACH procedure and/or a contention-based RACH procedure.

At step 906, the method 900 includes detecting, by the UE, a first link failure associated with a Pcell before the second link failure recovery has completed. In this example, the UE 115 may have in its queue two link failures to process, one link failure in the PCell and one link failure in the SCell.

At step 908, the method 900 includes adjusting, by the UE, the link failure recovery timer for the SCell to prioritize the first link failure for the PCell over the second link failure recovery for the SCell. The UE 115 may adjust the link failure recovery in a variety of ways.

In some examples, the UE 115 may adjust the link failure recovery by terminating the link failure recovery timer for the SCell in response to detecting the first link failure associated with the PCell. If the UE 115 terminates the link failure recovery timer for the SCell, the UE 115 may stop and reset the link failure recovery timer. The UE 115 may withdraw the current link failure recovery or the link failure recovery request (see step 905 in FIG. 9) for the SCell by terminating the link failure recovery timer for the SCell.

After the UE 115 terminates the link failure recovery timer for the SCell, the UE 115 may perform a variety of actions for prioritizing the first link failure recovery over the second link failure recovery. In an example, the UE 115 may send a failure indication for both the PCell and the SCell to the BS 105 via the PCell. When the BS 105 receives the failure indication, the BS 105 may detect and/or determine that both the PCell and the SCell have failed. In an example, the UE 115 may send the failure indication is a RACH preamble sequence. For example, he UE 115 may send the failure indication via a particular preamble sequence that the BS 105 recognizes as indicating that both the PCell and the SCell have failed. In another example, the UE 115 may send the failure indication using a message sent in at least one of a PUSCH, PUCCH, or a media access control-control element (MAC-CE) signaling. For example, the UE 115 may send, via a first cell (PCell) or a second cell (SCell), a message in at least one of a physical uplink shared channel (PUSCH), a physical uplink control channel (PUCCH), or a MAC-CE signaling, where the message indicates the first link failure in the first cell and the second link failure in the second cell. In another example, the UE 115 may send, via a third cell, a message in at least one of a PUSCH, a PUCCH, or a MAC-CE signaling, where the message indicates the first link failure in the first cell and the second link failure in the second cell, and the third cell is different from the first and second cells.

In another example, the UE 115 may complete the first link failure recovery (see method 300 in FIG. 3) and wait for the first link failure associated with the PCell to recover (see step 808 in FIG. 8) before starting the link failure recovery timer for the SCell and resending the link failure recovery request associated with the SCell. It should be understood that if the UE 115 detects the first link failure associated with the PCell (step 906) before the UE 115 starts sending the second link failure recovery request (see step 905), step 905 may be omitted. In this example, the UE 115 may send the link failure recovery request associated with the SCell after the first link failure has completed.

In some examples, the UE 115 may adjust the link failure recovery by pausing the link failure detection timer in response to detecting the first link failure associated with the PCell. The UE 115 may wait for the first link failure associated with the PCell to recover (see step 808 in FIG. 8). After the UE 115 determines that the first link failure associated with the PCell has recovered, the UE 115 resumes the second link failure recovery. The UE 115 resumes the second link failure recovery by starting the paused link failure detection timer and performing steps to complete the second link failure recovery.

Although the UE 115 has been described as sending a link failure recovery request in a RACH procedure to the BS 105 via the SCell, this is not intended to be limiting. In some examples, the UE 115 sends a link failure recovery request in a RACH procedure to the BS 105 via the PCell. The second link failure of the SCell may coincide with the first link failure of the PCell. The present disclosure provides techniques for handling link failures in both the PCell and the SCell when the UE 115 performs a RACH procedure in the PCell for the link failure recovery for the SCell.

In some examples, if the UE 115 has declared and/or determines a radio link failure for the PCell, the UE 115 may send a link failure recovery request for the SCell via the PCell after recovery of the first link failure associated with the PCell.

In some examples, before the first link failure recovery has completed and after detection of the first link failure, the UE 115 may be in the process of performing the first link failure recovery for the PCell. In an example, the UE 115 may send a failure indication for both the PCell and the SCell to the BS 105 via the PCell. The failure indication may be sent in a different resource (e.g., using a different preamble for RACH) to indicate both the PCell and the SCell have failed. In another example, the UE 115 sends a link failure recovery request for the SCell via the PCell after the PCell recovers from the first link failure.

In some examples, if the first link failure is detected after the UE 115 has sent the link failure recovery request for the SCell to the BS 105 via the PCell, the UE 115 may send a link failure recovery request in a RACH procedure via the PCell. the UE 115 may proceed with processing the first link failure recovery before the second link failure recovery. Additionally, the first link failure and the second link failure correspond to the same beam. In another example, the UE 115 may resend a link failure recovery request for the SCell via the PCell after recovery of the first link failure. In another example, the UE 115 may pause the second link failure recovery (e.g., pause the link failure recovery timer associated with the SCell) and resume the second link failure recovery after recovery of the first link failure.

The UE 115 may comply with a specification that specifies that the UE 115 pauses the second link failure recovery associated with the SCell and resumes the second link failure recovery after recovery of the first link failure (the PCell recovers) associated with the PCell. The UE 115 may expect to receive a response to the second link failure recovery for the SCell only after the the PCell recovers. In an example, the UE 115 may pause the second link failure recovery timer for the SCell when the first link failure is detected, and resumes the may second link failure recovery timer for the SCell after the PCell recovers. In another rex, the UE 115 may send a new beam indication (NBI) report based on the latest measurement for the second link failure recovery for the SCell after the PCell has recovered. The UE 115 may select or decide on a new candidate beam based on measuring a set of configured reference signals, upon detecting a link failure on the Scell. The UE 115 may send the NBI along with the link failure recovery request for the SCell. When the link failure recovery for the SCell is paused in response to detecting the first link failure on the Pcell, and later resumed, the UE 115 may send the updated NBI based on recent measurement to the BS 105.

In another example, the UE 115 withdraws the second link failure recovery request if the UE 115 detects the first link failure, and resends the second link failure recovery request after the PCell recovers.

In some examples, the UE 115 may send a new beam indicator of Scell along with the link failure recovery request for the SCell via the SCell. The UE 115 may have detected the first link failure before the second link failure recovery associated with the SCell completes. The UE 115 may resume the link failure recovery for the Scell after the link failure recovery for the PCell completes. The UE 115 may resend the NBI for the SCell, where the NBI is based on the latest measurement after the link failure recovery for the SCell resumes.

Figure 10:
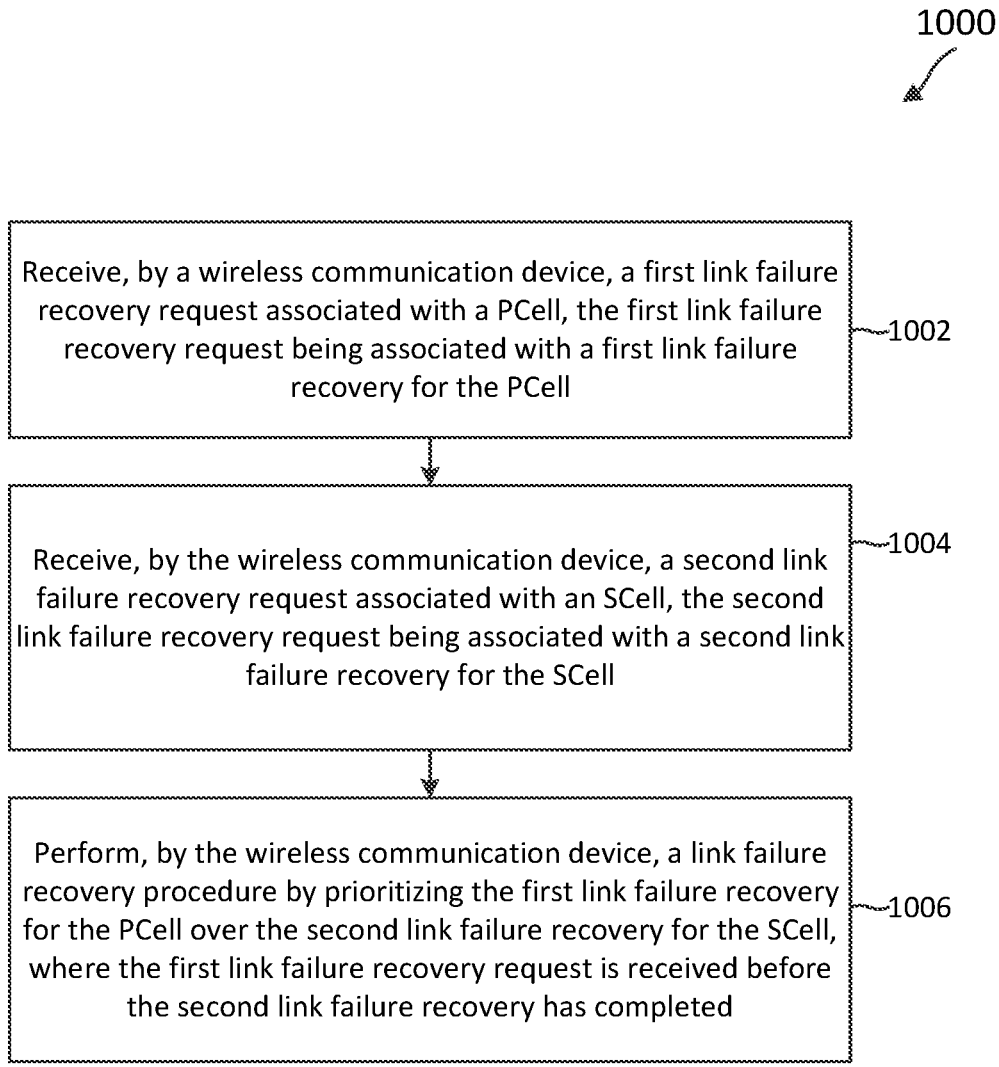
FIG. 10 is a flow diagram of a method of wireless communication for handling link failures associated with the PCell and/or SCell according to some embodiments of the present disclosure.

FIG. 10 is a flow diagram of a method 1000 of wireless communication for handling link failures associated with the PCell and/or SCell according to some embodiments of the present disclosure. Steps of the method 1000 can be executed by a computing device (e.g., a processor, processing circuit, and/or other suitable component) of a wireless communication device, such as the BS 105 or the BS 500. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1002, the method 1000 includes receiving, by a wireless communication device, a first link failure recovery request associated with a PCell, the first link failure recovery request being associated with a first link failure recovery for the PCell. In an example, the wireless communication device is the BS 105.

At step 1004, the method 1000 includes receiving, by the wireless communication device, a second link failure recovery request associated with an SCell, the second link failure recovery request being associated with a second link failure recovery for the SCell.

At step 1006, the method 1000 includes performing, by the wireless communication device, a link failure recovery procedure by prioritizing the first link failure recovery for the PCell over the second link failure recovery for the SCell, wherein the first link failure recovery request is received before the second link failure recovery has completed. In an example, the BS 105 may prioritize the first link failure recovery for the PCell over the second link failure recovery for the SCell by terminating or pausing the currently ongoing second link failure recovery for the SCell to process the first link failure recovery. After the PCell has has been recovered, the BS 105 may resume the second link failure recovery or resend a link failure recovery request for the SCell to the BS 105.

Further embodiments of the present disclosure include a method of wireless communication including detecting, by a wireless communication device, a first link failure associated with a PCell; detecting, by the wireless communication device, a second link failure associated with an SCell; and performing, by the wireless communication device, a link failure recovery procedure by prioritizing a first link failure recovery for the PCell over a second link failure recovery for the SCell, the second link failure being detected before the first link failure recovery has completed.

Further embodiments of the present disclosure include a method of wireless communication including detecting, by a wireless communication device, a first link failure associated with a first cell; detecting, by the wireless communication device, a second link failure associated with a second cell; and performing, by the wireless communication device, a link failure recovery procedure by prioritizing a first link failure recovery for the first cell over a second link failure recovery for the second cell.

In some embodiments, the first link failure is at least one of a radio link failure or a beam failure. In some embodiments, the second link failure is at least one of a radio link failure or a beam failure. In some embodiments, the method includes determining whether a number of uncompleted link failure recoveries is greater than a recovery threshold, where performing the link failure recovery procedure includes performing the link failure recovery procedure in response to a determination that the number of uncompleted link failure recoveries is greater than the recovery threshold. Additionally, the method may include in response to a determination that the number of currently uncompleted link failure recoveries is not greater than the recovery threshold, performing a second link failure recovery procedure by completing the first link failure recovery independent from completing the second link failure recovery.

In some embodiments, the method includes performing the first link failure recovery in response to detecting the first link failure; and performing the second link failure recovery in response to detecting the second link failure. In an example, performing the first link failure recovery may include starting a first link failure recovery timer for the PCell and sending a first link failure recovery request to the BS via the PCell. In another example, performing the second link failure recovery may include starting a second link failure recovery timer for the SCell and sending a second link failure recovery request to a BS via the SCell. In another example, performing the second link failure recovery may include starting a second link failure recovery timer for the SCell and sending a second link failure recovery request to a BS via the PCell.

In some embodiments, the first link failure is detected before the second link failure. In an example, the wireless communication device may prioritize the first link failure recovery for the PCell over the second link failure recovery for the SCell by completing the first link failure recovery before initiating the second link failure recovery. In another example, the wireless communication device may prioritize the first link failure recovery for the PCell over the second link failure recovery for the SCell by completing the first link failure recovery before completing the second link failure recovery.

In some embodiments, performing the second link failure recovery includes sending a link failure recovery request to a BS via the SCell. In some embodiments, the method includes starting a link failure recovery timer for the SCell in response to detecting the second link failure, where the first link failure is detected after starting the link failure recovery timer; and adjusting the link failure recovery timer for the SCell to prioritize the first link failure for the PCell over the second link failure recovery for the SCell. In an example, adjusting the link failure recovery timer for the SCell may include terminating the link failure recovery timer for the SCell in response to detecting the first link failure associated with the PCell.

In some embodiments, the method also includes performing the first link failure recovery after terminating the link failure recovery timer; and sending a link failure recovery request for the SCell after completing the first link failure recovery. In some embodiments, the method also includes sending a failure indication for the PCell and the SCell via the PCell after terminating the link failure recovery timer. In an example, the failure indication is a RACH preamble sequence. In another example, the failure indication is a message sent in at least one of a PUSCH, PUCCH, or a MAC-CE signaling. In another example, adjusting the link failure recovery timer for the SCell may include pausing the link failure recovery timer for the SCell in response to detecting the first link failure associated with the PCell. In some embodiments, the method also includes sending via a third cell a message indicating the first link failure in the first cell and the second link failure in the second cell, where the third cell is different from the first and second cells. The message may be transmitted in at least one of a PUSCH, a PUCCH, or a MAC-CE.

In some embodiments, the method also includes performing the first link failure recovery after pausing the link failure recovery timer; and resuming the second link failure recovery after completing the first link failure recovery. In an example, resuming the second link failure recovery may include resuming the link failure recovery timer. In some embodiments, the method also includes selecting a new candidate beam associated with the SCell, the new candidate beam being selected based on measuring a reference signal; sending an indication of the new candidate beam and a link failure recovery request for the SCell; and resending an indication of a new candidate beam based on a most recent measurement of the reference signal after the second link failure recovery resumes.

In some embodiments, the method also includes declaring, by the wireless communication device, a radio link failure in accordance with performing the first link failure recovery; recovering from the first link failure; and sending a second link failure recovery request to a BS via the PCell after recovering from the first link failure. In some embodiments, the method also includes sending a failure indication for the PCell and the SCell via the PCell before the first link failure recovery has completed and after detecting the second link failure. In an example, the failure indication is a RACH preamble sequence. In another example, the failure indication is a message sent in at least one of a PUSCH, PUCCH, or a MAC-CE signaling.

In some embodiments, the method also includes recovering from the first link failure; and sending a second link failure recovery request for the SCell to a BS via the PCell after recovering from the first link failure. In some embodiments, the method also includes sending a second link failure recovery request for the SCell to a BS via the PCell, wherein the second link failure recovery request is sent before the first link failure is detected, the first and second link failures corresponding to a common beam. The method may also include recovering from the first link failure before sending the second link failure recovery request.

Further embodiments of the present disclosure include an apparatus including a processor configured to: detect a first link failure associated with a first cell; detect a second link failure associated with a second cell; and perform a link failure recovery procedure by prioritizing a first link failure recovery for the first cell over a second link failure recovery for the second cell.

Further embodiments of the present disclosure include an apparatus comprising including a processor configured to detect a first link failure associated with a PCell and configured to detect a second link failure associated with an SCell, wherein the processor is configured to perform a link failure recovery procedure by prioritizing a first link failure recovery for the PCell over a second link failure recovery for the SCell, the second link failure being detected before the first link failure recovery has completed.

Further embodiments of the present disclosure include a computer-readable medium having program code recorded thereon. The program code includes code for causing a user equipment (UE) to detect a first link failure associated with a PCell; code for causing the UE to detect a second link failure associated with an SCell; and code for causing the UE to perform a link failure recovery procedure by prioritizing a first link failure recovery for the PCell over a second link failure recovery for the SCell, the second link failure being detected before the first link failure recovery has completed.

Further embodiments of the present disclosure include an apparatus including means for detecting, by a wireless communication device, a first link failure associated with a PCell; means for detecting, by the wireless communication device, a second link failure associated with an SCell; and means for performing, by the wireless communication device, a link failure recovery procedure by prioritizing a first link failure recovery for the PCell over a second link failure recovery for the SCell, the second link failure being detected before the first link failure recovery has completed.

Further embodiments of the present disclosure include a method of wireless communication including receiving, by a wireless communication device, a first link failure recovery request associated with a first link failure recovery for a first cell; receiving, by the wireless communication device, a second link failure recovery request associated with a second link failure recovery for a second cell; and performing, by the wireless communication device, a link failure recovery procedure by prioritizing the first link failure recovery for the first cell over the second link failure recovery for the second cell.

Further embodiments of the present disclosure include a method of wireless communication including receiving, by a wireless communication device, a first link failure recovery request associated with a PCell, the first link failure recovery request being associated with a first link failure recovery for the PCell; receiving, by the wireless communication device, a second link failure recovery request associated with an SCell, the second link failure recovery request being associated with a second link failure recovery for the SCell; and performing, by the wireless communication device, a link failure recovery procedure by prioritizing the first link failure recovery for the PCell over the second link failure recovery for the SCell, wherein the first link failure recovery request is received before the second link failure recovery has completed.

In some embodiments, the wireless communication device is a BS. In some embodiments, the first link failure is at least one of a radio link failure or a beam failure. In some embodiments, the second link failure is at least one of a radio link failure or a beam failure. In some embodiments, the method includes performing the first link failure recovery in response to receiving the first link failure recovery request; and performing the second link failure recovery in response to receiving the second link failure recovery request. In an example, receiving the first link failure recovery request may include receiving the first link failure recovery request before receiving the second link failure recovery request. In another example, receiving the first link failure recovery request includes receiving the first link failure recovery request via the PCell. In another example, receiving the second link failure recovery request includes receiving the second link failure recovery request via the SCell.

In some embodiments, the method includes pausing the second link failure recovery in response to receiving the first link failure recovery request; and resuming the second link failure recovery after the first link failure recovery has completed. The method may include pausing the second link failure recovery in response to detecting the first link failure; receiving a first indication of a first new candidate beam associated with the SCell, the new candidate beam being selected based on a reference signal measurement by the UE; and receiving a second indication of a second new candidate beam from the UE after resuming the second link failure recovery. The method may include terminating the second link failure recovery in response to receiving the first link failure recovery request.

In an example, receiving the first and second link failure recovery requests may include receiving a RACH preamble sequence indicating that the PCell and the SCell have failed. In another example, receiving the first and second link failure recovery requests includes receiving a message sent in at least one of a PUSCH, PUCCH, or a MAC-CE signaling.

Further embodiments of the present disclosure include an apparatus including a receiver configured to receive a first link failure recovery request associated with a first link failure recovery for a first cell; and receive a second link failure recovery request associated with a second link failure recovery for a second cell; and a processor configured to perform a link failure recovery procedure by prioritizing the first link failure recovery for the first cell over the second link failure recovery for the second cell.

Further embodiments of the present disclosure include an apparatus including a receiver configured to receive a first link failure recovery request associated with a PCell and further configured to receive a second link failure recovery request associated with an SCell, the first link failure recovery request being associated with a first link failure recovery for the PCell, and the second link failure recovery request being associated with a second link failure recovery for the SCell; and a processor configured to perform a link failure recovery procedure by prioritizing the first link failure recovery for the PCell over the second link failure recovery for the SCell, wherein the first link failure recovery request is received before the second link failure recovery has completed.

Further embodiments of the present disclosure include a computer-readable medium having program code recorded thereon. The program code includes code for causing a BS to receive a first link failure recovery request associated with a PCell, the first link failure recovery request being associated with a first link failure recovery for the PCell; code for causing the BS to receive a second link failure recovery request associated with an SCell, the second link failure recovery request being associated with a second link failure recovery for the SCell; and code for causing the BS to perform a link failure recovery procedure by prioritizing the first link failure recovery for the PCell over the second link failure recovery for the SCell, wherein the first link failure recovery request is received before the second link failure recovery has completed.

Further embodiments of the present disclosure include an apparatus including means for receiving, by a wireless communication device, a first link failure recovery request associated with a PCell, the first link failure recovery request being associated with a first link failure recovery for the PCell; means for receiving, by the wireless communication device, a second link failure recovery request associated with an SCell, the second link failure recovery request being associated with a second link failure recovery for the SCell; and means for performing, by the wireless communication device, a link failure recovery procedure by prioritizing the first link failure recovery for the PCell over the second link failure recovery for the SCell, wherein the first link failure recovery request is received before the second link failure recovery has completed.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    detecting, by a wireless communication device, a first link failure associated with a first cell;
    detecting, by the wireless communication device, a second link failure associated with a second cell; and
    performing, by the wireless communication device, a link failure recovery procedure by prioritizing a first link failure recovery for the first cell over a second link failure recovery for the second cell, wherein prioritizing the first link failure recovery for the first cell over the second link failure recovery for the second cell includes initiating the second link failure recovery after the first link failure recovery ends.

2. The method of claim 1, wherein the first cell is one of a primary cell (PCell) or a secondary cell (SCell), and the second cell is the other one of the PCell or the SCell.

3. The method of claim 1, wherein detecting the second link failure includes detecting the second link failure after detecting the first link failure or wherein detecting the first link failure includes detecting the first link failure after detecting the second link failure.

4. The method of claim 1, comprising:
    performing the first link failure recovery in response to detecting the first link failure, wherein the performing the first link failure recovery includes starting a first link failure recovery timer for the first cell and sending a first link failure recovery request to a base station (BS) via the first cell.

5. The method of claim 1, wherein prioritizing the first link failure recovery for the first cell over the second link failure recovery for the second cell further includes completing the first link failure recovery before completing the second link failure recovery.

6. The method of claim 1, comprising:
    performing the second link failure recovery by sending a second link failure recovery request associated with the second cell to a BS via the second cell;
    starting a link failure recovery timer for the second cell in response to detecting the second link failure, wherein detecting the first link failure includes detecting the first link failure after the starting a link failure recovery timer; and
    adjusting the link failure recovery timer for the second cell to prioritize the first link failure for the first cell over the second link failure recovery for the second cell.

7. The method of claim 6, wherein adjusting the link failure recovery timer for the second cell includes pausing the link failure recovery timer for the second cell in response to detecting the first link failure associated with the first cell.

8. The method of claim 7, comprising:
performing the first link failure recovery after pausing the link failure recovery timer; and
resuming the second link failure recovery after completing the first link failure recovery.

9. The method of claim 8, comprising:
measuring a reference signal;
selecting a new candidate beam associated with the second cell based on the reference signal;
sending an indication of the new candidate beam and the second link failure recovery request for the second cell; and
resending the indication of the new candidate beam based on a most recent measurement of the reference signal after the second link failure recovery resumes.

10. An apparatus comprising:
a processor configured to:
detect a first link failure associated with a first cell;
detect a second link failure associated with a second cell; and
perform a link failure recovery procedure, wherein, to perform the link failure recovery procedure, the processor is configured to prioritize a first link failure recovery for the first cell over a second link failure recovery for the second cell, and wherein, to prioritize the first link failure recovery for the first cell over the second link failure recovery for the second cell, the processor is configured to initiate the second link failure recovery after the first link failure recovery ends.

11. The apparatus of claim 10, wherein:
the first cell is a primary cell (PCell), and the second cell is a secondary cell (SCell); or
the first cell is a SCell and the second cell is a PCell.

12. The apparatus of claim 10, wherein the processor is configured to:
detect the second link failure after the first link failure; or
detect the first link failure after the second link failure.

13. The apparatus of claim 10, further comprising:
a transceiver in communication with the processor, wherein the transceiver is configured to send a random access channel (RACH) preamble sequence via the first cell, wherein the RACH preamble sequence indicates the first link failure in the first cell and the second link failure in the second cell.

14. The apparatus of claim 10, wherein, to perform the link failure recovery procedure, the processor is configured to perform the first link failure recovery in response to detecting the first link failure.

15. The apparatus of claim 10, wherein, to perform the first link failure recovery procedure, the processor is configured to start a first link failure recovery timer for the first cell and send a first link failure recovery request in a contention-free RACH procedure or a contention-based RACH procedure to a base station (BS) via the first cell.

16. The apparatus of claim 10, wherein, to perform the link failure recovery procedure, the processor is configured to start a second link failure recovery timer for the second cell and send a second link failure recovery request to a base station (BS) via the first cell or the second cell.

17. The apparatus of claim 10, wherein, to prioritize the first link failure recovery for the first cell over the second link failure recovery for the second cell, the processor is configured to complete the first link failure recovery before completing the second link failure recovery.

18. The apparatus of claim 10, wherein, to perform the second link failure recovery, the processor is configured to:

send a second link failure recovery request associated with the second cell to a base station (BS) via the second cell;
start a link failure recovery timer for the second cell in response to detecting the second link failure, wherein the detecting the first link failure includes detecting the first link failure after starting the link failure recovery timer; and
adjust the link failure recovery timer for the second cell to prioritize the first link failure recovery for the first cell over the second link failure recovery for the second cell.

19. The apparatus of claim 18, wherein, to adjust the link failure recovery timer for the second cell, the processor is configured to pause the link failure recovery timer for the second cell in response to detecting the first link failure associated with the first cell.

20. The apparatus of claim 19, wherein, to perform the first link failure recovery, the processor is configured to pause the link failure recovery timer; and
resume the second link failure recovery after completing the first link failure recovery.

21. The apparatus of claim 10, wherein the processor is configured to:
measure a reference signal;
select a new candidate beam associated with the second cell based on the reference signal;
send an indication of the new candidate beam and the second link failure recovery request for the second cell; and
resend the indication of the new candidate beam based on a most recent measurement of the reference signal after the second link failure recovery resumes.

22. The apparatus of claim 10, wherein the processor is configured to send, via a third cell, a message indicating the first link failure in the first cell and the second link failure in the second cell via at least one of a physical uplink shared channel (PUSCH), a physical uplink control channel (PUCCH), or a media access control-control element (MAC-CE) signal, wherein the third cell is different from the first cell and the second cell.

23. The apparatus of claim 10, wherein the first link failure includes a first beam failure and the second link failure includes a second beam failure.

24. A method of wireless communication, comprising:
receiving, by a wireless communication device, a first link failure recovery request associated with a first link failure recovery for a first cell;
receiving, by the wireless communication device, a second link failure recovery request associated with a second link failure recovery for a second cell; and
performing, by the wireless communication device, a link failure recovery procedure by prioritizing the first link failure recovery for the first cell over the second link failure recovery for the second cell, wherein prioritizing the first link failure recovery for the first cell over the second link failure recovery for the second cell includes initiating the second link failure recovery after the first link failure recovery ends.

25. The method of claim 24, wherein receiving the first link failure recovery request includes at least one of:
receiving the first link failure recovery request after receiving the second link failure recovery request; or
receiving the first link failure recovery request before receiving the second link failure recovery request.

26. The method of claim 24, wherein receiving the first and second link failure recovery requests includes receiving via the first cell a RACH preamble sequence indicating that the first cell and the second cell have failed or receiving via a third cell a message in at least one of a physical uplink shared channel (PUSCH), a physical uplink control channel (PUCCH), or a media access control-control element (MAC-CE) signaling, wherein the message indicates that the first cell and the second cell have failed, and wherein the third cell is different from the first cell and the second cell.

27. An apparatus comprising:
a receiver configured to:
receive a first link failure recovery request associated with a first link failure recovery for a first cell;
receive a second link failure recovery request associated with a second link failure recovery for a second cell; and
a processor coupled to the receiver, wherein the processor is configured to perform a link failure recovery procedure, wherein, to perform the link failure recovery procedure, the processor is configured to prioritize the first link failure recovery for the first cell over the second link failure recovery for the second cell, and wherein, to prioritize the first link failure recovery for the first cell over the second link failure recovery for the second cell, the processor is configured to initiate the second link failure recovery after the first link failure recovery ends.

28. The apparatus of claim 27, wherein the first cell is one of a primary cell (PCell) or the secondary cell (SCell), and the second cell is the other of the PCell or the secondary cell (SCell).

29. The apparatus of claim 27, wherein:
the receiver is configured to receive the first link failure recovery request after receiving the second link failure recovery request; or
the receiver is configured to receive receives the first link failure recovery request before receiving the second link failure recovery request.

30. The apparatus of claim 27, wherein the receiver is further configured to:
receive, via the first cell, a RACH preamble sequence indicating that the first cell and the second cell have failed; or
receive, via a third cell, a message in at least one of a physical uplink shared channel (PUSCH), a physical uplink control channel (PUCCH), or a media access control-control element (MAC-CE) signaling, wherein the message indicates that the first cell and the second cell have failed, and wherein the third cell is different from the first cell and the second cell.

* * * * *